US010035932B2

(12) United States Patent
McGuire, Jr.

(10) Patent No.: US 10,035,932 B2
(45) Date of Patent: Jul. 31, 2018

(54) PAINT REPLACEMENT FILMS, COMPOSITES THEREFROM, AND RELATED METHODS

(75) Inventor: James E. McGuire, Jr., Columbus, OH (US)

(73) Assignee: AERO Advanced Paint Technology, Inc., Columbus, OH (US)

( * ) Notice: Subject to any disclaimer, the term of this patent is extended or adjusted under 35 U.S.C. 154(b) by 10 days.

(21) Appl. No.: 12/529,712

(22) PCT Filed: Sep. 25, 2007

(86) PCT No.: PCT/US2007/079346
§ 371 (c)(1),
(2), (4) Date: Sep. 3, 2009

(87) PCT Pub. No.: WO2009/041964
PCT Pub. Date: Apr. 2, 2009

(65) Prior Publication Data
US 2010/0059167 A1    Mar. 11, 2010

(51) Int. Cl.
*B32B 7/12* (2006.01)
*C09J 7/29* (2018.01)

(52) U.S. Cl.
CPC ........... *C09J 7/29* (2018.01); *C09J 2201/162* (2013.01); *C09J 2433/00* (2013.01); *C09J 2475/006* (2013.01); *Y10T 428/266* (2015.01); *Y10T 428/2848* (2015.01)

(58) Field of Classification Search
CPC .... B32B 7/12; B32B 37/18; C09J 1/00; C09J 7/00; C09J 123/00; C09J 159/00
USPC .................. 428/354, 337; 156/94
See application file for complete search history.

(56) References Cited

U.S. PATENT DOCUMENTS

| | | |
|---|---|---|
| 2,914,556 A | 11/1958 | Hostettler et al. |
| 2,871,218 A | 1/1959 | Schollenberger |
| 3,296,196 A | 1/1967 | Lamoreaux |
| 3,463,662 A | 8/1969 | Hodes et al. |
| 3,509,015 A | 4/1970 | Wismer et al. |
| 3,523,100 A | 8/1970 | Stein et al. |
| 3,523,101 A | 8/1970 | Reuter |
| 3,549,583 A | 12/1970 | Nobuyoshi et al. |
| 3,554,951 A | 1/1971 | Blomeyer et al. |
| 3,616,198 A | 10/1971 | Kenji |
| 3,661,672 A | 5/1972 | John |
| 3,867,350 A | 2/1975 | Pedain et al. |
| 3,899,467 A | 8/1975 | Bonk et al. |
| 3,899,621 A | 8/1975 | Willdorf |
| 4,007,151 A | 2/1977 | Ogawa et al. |
| 4,081,578 A | 3/1978 | Van Essen et al. |
| 4,092,198 A | 5/1978 | Herbert et al. |
| 4,092,199 A | 5/1978 | Israel et al. |
| 4,093,766 A | 6/1978 | Herbert et al. |
| 4,101,698 A | 7/1978 | Dunning et al. |
| 4,154,882 A | 5/1979 | Israel et al. |
| 4,201,799 A | 5/1980 | Stephens |
| 4,207,356 A | 6/1980 | Waugh |
| 4,241,140 A | 12/1980 | Ammons |
| 4,269,945 A | 5/1981 | Vanderhider |
| 4,296,156 A | 10/1981 | Lustig et al. |
| 4,371,686 A | 2/1983 | Yamamoto et al. |
| 4,420,525 A | 12/1983 | David |
| 4,476,293 A | 10/1984 | Robinson |
| 4,496,628 A | 1/1985 | Deatcher et al. |
| 4,501,852 A | 2/1985 | Markusch et al. |
| 4,530,976 A | 7/1985 | Kordomenos et al. |
| 4,550,052 A | 10/1985 | Malek |
| 4,578,426 A | 3/1986 | Lenz et al. |
| 4,611,043 A | 9/1986 | Burson et al. |
| 4,657,795 A | 4/1987 | Foret |
| 4,705,721 A | 11/1987 | Frisch et al. |
| 4,741,961 A | 5/1988 | Frisch et al. |
| 4,745,152 A | 5/1988 | Fock et al. |
| 4,748,192 A | 5/1988 | Smith |
| 4,751,121 A | 6/1988 | Kuhnel et al. |
| 4,766,038 A | 8/1988 | de Vroom et al. |
| 4,774,043 A | 9/1988 | Beckmann |
| 4,810,540 A | 3/1989 | Ellison et al. |
| 4,900,611 A | 2/1990 | Carroll |
| 4,913,760 A | 4/1990 | Benson et al. |
| 4,917,928 A * | 4/1990 | Heinecke .............. A61F 13/023 428/124 |
| 4,919,994 A | 4/1990 | Joseph |
| 4,921,776 A | 5/1990 | Taylor |
| 4,931,324 A | 6/1990 | Ellison et al. |
| 4,933,237 A | 6/1990 | Krenceski et al. |
| 4,948,654 A | 8/1990 | Brooks et al. |
| 4,966,527 A | 10/1990 | Merz |
| 5,000,903 A | 3/1991 | Matzinger et al. |
| 5,034,275 A | 7/1991 | Pearson et al. |
| 5,055,346 A | 10/1991 | Rohrbacher |
| 5,070,172 A | 12/1991 | Hirai et al. |
| 5,077,373 A | 12/1991 | Tsuda et al. |
| 5,114,514 A | 5/1992 | Landis |

(Continued)

FOREIGN PATENT DOCUMENTS

| | | |
|---|---|---|
| AU | 572168 | 5/1988 |
| DE | 2600241 | 7/1977 |

(Continued)

OTHER PUBLICATIONS

"3M Aircraft Belly Protective Tape 8641 Technical Data Sheet," Minnesota Mining & Manufacturing Co. (St. Paul, MN) Publication No. 70-0703-7681-2 (Mar. 2007).

(Continued)

*Primary Examiner* — Cheng Huang
(74) *Attorney, Agent, or Firm* — The Griffith Law Firm, A P.C.; Lisa M. Griffith

(57) ABSTRACT

Paint replacement films of the invention comprise at least one adhesive layer; at least one pigmented layer; and at least one polymer layer that is essentially free of low surface energy materials. In addition, paint replacement composite articles and related methods of the invention comprise a paint replacement film and a topcoat on a surface of the paint replacement film opposite the adhesive layer. Paint replacement films and composite articles of the invention are useful when applied to a variety of articles (e.g., a motorized vehicle such as an aircraft).

32 Claims, No Drawings

(56) References Cited

U.S. PATENT DOCUMENTS

| | | | |
|---|---|---|---|
| 5,114,789 A | 5/1992 | Reafler | |
| 5,123,814 A | 6/1992 | Burdick et al. | |
| 5,141,783 A | 8/1992 | Corsi et al. | |
| 5,203,189 A | 4/1993 | Lovejoy et al. | |
| 5,215,811 A | 6/1993 | Reafler et al. | |
| 5,219,643 A | 6/1993 | Schmidt et al. | |
| 5,232,527 A | 8/1993 | Vernhet et al. | |
| 5,242,744 A | 9/1993 | Schryer | |
| 5,242,751 A | 9/1993 | Hartman | |
| 5,268,215 A | 12/1993 | Krenceski et al. | |
| 5,288,356 A | 2/1994 | Benefiel | |
| 5,306,548 A * | 4/1994 | Zabrocki et al. | 428/215 |
| 5,310,080 A | 5/1994 | Figge | |
| 5,334,450 A | 8/1994 | Zabrocki et al. | |
| 5,342,666 A | 8/1994 | Ellison et al. | |
| 5,391,686 A | 2/1995 | Jadhav et al. | |
| 5,403,880 A | 4/1995 | Hegedus et al. | |
| 5,405,675 A | 4/1995 | Sawka et al. | |
| 5,468,532 A | 11/1995 | Ho et al. | |
| 5,478,596 A | 12/1995 | Gurney | |
| 5,486,096 A | 1/1996 | Hertel et al. | |
| 5,518,786 A | 5/1996 | Johnson et al. | |
| 5,556,677 A | 9/1996 | Quigley et al. | |
| 5,560,979 A | 10/1996 | Bloom et al. | |
| 5,562,979 A | 10/1996 | Easterlow et al. | |
| 5,563,206 A | 10/1996 | Eicken et al. | |
| 5,567,502 A * | 10/1996 | Miyabara et al. | 428/141 |
| 5,582,887 A * | 12/1996 | Etheredge | G09F 3/0292 206/807 |
| 5,587,230 A | 12/1996 | Lin et al. | |
| 5,604,006 A | 2/1997 | Ponchaud et al. | |
| 5,614,297 A | 3/1997 | Velazquez | |
| 5,620,819 A | 4/1997 | Conforti et al. | |
| 5,641,374 A | 6/1997 | Peterson et al. | |
| 5,688,571 A | 11/1997 | Quigley et al. | |
| 5,707,941 A | 1/1998 | Haberle | |
| 5,736,204 A | 4/1998 | Suskind | |
| 5,768,285 A | 6/1998 | Griep et al. | |
| 5,770,313 A | 6/1998 | Furumoto et al. | |
| 5,786,285 A | 7/1998 | Walla et al. | |
| 5,820,491 A | 10/1998 | Hatch et al. | |
| 5,848,769 A | 12/1998 | Fronek et al. | |
| 5,849,168 A | 12/1998 | Lutz | |
| 5,858,495 A * | 1/1999 | Eikmeier et al. | 428/40.1 |
| 5,866,257 A | 2/1999 | Schledjewski et al. | |
| 5,877,254 A | 3/1999 | La Casse et al. | |
| 5,882,775 A | 3/1999 | Matsui et al. | |
| 5,912,081 A | 6/1999 | Negele et al. | |
| 5,912,193 A | 6/1999 | Iwata et al. | |
| 5,912,195 A | 6/1999 | Walla et al. | |
| 5,928,778 A | 7/1999 | Takahashi et al. | |
| 5,939,188 A | 8/1999 | Moncur et al. | |
| 5,945,199 A | 8/1999 | Morin et al. | |
| 5,955,204 A | 9/1999 | Yamamoto et al. | |
| 5,965,256 A | 10/1999 | Barrera | |
| 5,968,444 A | 10/1999 | Yamamoto | |
| 5,985,079 A | 11/1999 | Ellison et al. | |
| 6,001,906 A | 12/1999 | Golumbic | |
| 6,037,054 A | 3/2000 | Shirai et al. | |
| 6,054,208 A | 4/2000 | Rega et al. | |
| 6,071,583 A | 6/2000 | Pomerantz | |
| 6,096,396 A | 8/2000 | Patton et al. | |
| 6,132,864 A | 10/2000 | Kiriazis et al. | |
| 6,153,718 A | 11/2000 | Imashiro et al. | |
| 6,177,189 B1 | 1/2001 | Rawlings et al. | |
| 6,210,295 B1 | 4/2001 | Yoneyama | |
| 6,210,796 B1 | 4/2001 | Lobert et al. | |
| 6,254,712 B1 | 7/2001 | Enlow et al. | |
| 6,258,918 B1 | 7/2001 | Ho et al. | |
| 6,319,353 B1 | 11/2001 | Mussig | |
| 6,336,988 B1 | 1/2002 | Enlow et al. | |
| 6,369,186 B1 | 4/2002 | Branland et al. | |
| 6,383,644 B2 | 5/2002 | Fuchs | |
| 6,389,602 B1 | 5/2002 | Alsaffar | |
| 6,399,193 B1 * | 6/2002 | Ellison | 428/354 |
| 6,436,531 B1 | 8/2002 | Kollaja et al. | |
| 6,458,875 B1 | 10/2002 | Sandlin et al. | |
| 6,458,880 B1 | 10/2002 | Onder et al. | |
| 6,475,559 B1 | 11/2002 | Bettinger | |
| 6,475,616 B1 | 11/2002 | Dietz et al. | |
| 6,479,142 B1 | 11/2002 | Condon et al. | |
| 6,485,836 B1 | 11/2002 | Reihs et al. | |
| 6,518,359 B1 | 2/2003 | Clemens et al. | |
| 6,518,389 B1 | 2/2003 | Kaufhold et al. | |
| 6,521,164 B1 | 2/2003 | Plummer et al. | |
| 6,521,337 B2 | 2/2003 | Yanagiuchi | |
| 6,579,601 B2 | 6/2003 | Kollaja et al. | |
| 6,592,173 B2 | 7/2003 | Hardgrive et al. | |
| 6,602,591 B1 | 8/2003 | Smith | |
| 6,607,831 B2 | 8/2003 | Ho et al. | |
| 6,612,944 B1 | 9/2003 | Bureau | |
| 6,624,276 B2 | 9/2003 | Lamers et al. | |
| 6,627,018 B1 | 9/2003 | O'Neill et al. | |
| 6,638,467 B1 | 10/2003 | Yamamoto | |
| 6,642,159 B1 | 11/2003 | Bhatnagar et al. | |
| 6,649,003 B1 | 11/2003 | Spain et al. | |
| 6,649,693 B2 | 11/2003 | Konishi et al. | |
| 6,651,011 B1 | 11/2003 | Bache | |
| 6,659,625 B2 | 12/2003 | Hanasaki | |
| 6,673,428 B1 | 1/2004 | Reafler | |
| 6,677,028 B1 | 1/2004 | Lasch et al. | |
| 6,680,111 B1 | 1/2004 | Leibler et al. | |
| 6,682,679 B1 | 1/2004 | Marentic et al. | |
| 6,709,723 B2 | 3/2004 | Roys et al. | |
| 6,709,748 B1 | 3/2004 | Ho et al. | |
| 6,713,185 B2 | 3/2004 | Carlson et al. | |
| 6,723,427 B1 | 4/2004 | Johnson et al. | |
| 6,723,472 B2 | 4/2004 | Nakanishi et al. | |
| 6,726,971 B1 | 4/2004 | Wong | |
| 6,730,388 B2 | 5/2004 | MacQueen et al. | |
| 6,733,870 B2 | 5/2004 | Enlow et al. | |
| 6,734,273 B2 | 5/2004 | Onder | |
| 6,753,056 B1 * | 6/2004 | Mizumoto | 428/41.8 |
| 6,755,757 B2 | 6/2004 | Sutherland | |
| 6,762,243 B2 | 7/2004 | Stender et al. | |
| 6,770,360 B2 | 8/2004 | Mientus et al. | |
| 6,790,525 B2 | 9/2004 | Takeuchi et al. | |
| 6,790,526 B2 | 9/2004 | Vargo et al. | |
| 6,797,098 B2 | 9/2004 | Watanabe et al. | |
| 6,806,212 B2 | 10/2004 | Fyfe | |
| 6,811,628 B1 | 11/2004 | Reid et al. | |
| 6,824,818 B2 | 11/2004 | McCoy et al. | |
| 6,824,834 B2 | 11/2004 | Schafheutle et al. | |
| 6,827,895 B1 | 12/2004 | Yamamoto | |
| 6,835,267 B1 | 12/2004 | Spain et al. | |
| 6,835,367 B2 | 12/2004 | Spain et al. | |
| 6,838,130 B1 | 1/2005 | Spain et al. | |
| 6,852,268 B1 | 2/2005 | Valyi et al. | |
| 6,852,377 B2 | 2/2005 | Bohm et al. | |
| 6,852,418 B1 | 2/2005 | Zurbig et al. | |
| 6,866,383 B2 | 3/2005 | Kirit et al. | |
| 6,869,496 B1 | 3/2005 | Kollaja et al. | |
| 6,881,856 B2 | 4/2005 | Tanaka et al. | |
| 6,890,628 B2 | 5/2005 | Kerr | |
| 6,893,596 B2 | 5/2005 | Haas et al. | |
| 6,894,084 B2 | 5/2005 | Kovar et al. | |
| 6,908,401 B2 | 6/2005 | Cheng | |
| 6,966,962 B2 | 11/2005 | Spain et al. | |
| 6,998,084 B2 | 2/2006 | Horansky | |
| 7,005,103 B2 | 2/2006 | Smith et al. | |
| 7,005,183 B2 | 2/2006 | Kondo | |
| 7,005,794 B2 | 2/2006 | Watanabe et al. | |
| 7,011,777 B2 | 3/2006 | Schmidt | |
| 7,048,989 B2 | 5/2006 | Watkins et al. | |
| 7,108,618 B2 | 9/2006 | Frischmon et al. | |
| 7,128,669 B2 | 10/2006 | Blotteaux | |
| 7,141,294 B2 | 11/2006 | Sakurai et al. | |
| 7,141,303 B2 | 11/2006 | Clemens et al. | |
| 7,160,973 B2 | 1/2007 | Ohrbom et al. | |
| 7,166,249 B2 | 1/2007 | Abrams et al. | |
| 7,279,057 B2 | 10/2007 | Reid et al. | |
| 7,282,533 B2 | 10/2007 | Kreitschmann et al. | |
| 7,316,832 B2 | 1/2008 | Steinhardt et al. | |
| RE40,723 E | 6/2009 | Matsui et al. | |

(56) References Cited

U.S. PATENT DOCUMENTS

| | | | |
|---|---|---|---|
| 7,854,985 B2 | 12/2010 | Song et al. | |
| 7,931,954 B2 | 4/2011 | Kobayashi et al. | |
| 8,062,451 B2 | 11/2011 | Mozer et al. | |
| 8,071,000 B2 | 12/2011 | Neitzke et al. | |
| 8,105,686 B2* | 1/2012 | Blackwell et al. | 428/355 AC |
| 8,117,679 B2 | 2/2012 | Pierce | |
| 8,501,315 B2 | 8/2013 | Tanaka et al. | |
| 8,545,959 B2 | 10/2013 | McGuire, Jr. et al. | |
| 8,545,960 B2 | 10/2013 | McGuire, Jr. et al. | |
| 8,551,279 B2 | 10/2013 | Johnson et al. | |
| 8,765,263 B2 | 7/2014 | Ho et al. | |
| 8,828,303 B2 | 9/2014 | McGuire, Jr. et al. | |
| 8,927,106 B2 | 1/2015 | Ho et al. | |
| 2002/0006516 A1 | 1/2002 | Ito et al. | |
| 2002/0015772 A1 | 2/2002 | Munch et al. | |
| 2002/0018889 A1 | 2/2002 | Franck et al. | |
| 2002/0061374 A1 | 5/2002 | O'Brien et al. | |
| 2002/0157772 A1 | 10/2002 | Enlow et al. | |
| 2002/0193460 A1 | 12/2002 | Kovar et al. | |
| 2002/0195910 A1 | 12/2002 | Hus et al. | |
| 2003/0003282 A1 | 1/2003 | Roys et al. | |
| 2003/0026932 A1 | 2/2003 | Johnson et al. | |
| 2003/0060574 A1 | 3/2003 | Muller et al. | |
| 2003/0203190 A1 | 10/2003 | Schmidt et al. | |
| 2003/0211334 A1 | 11/2003 | Jones | |
| 2004/0048073 A1 | 3/2004 | Bacon | |
| 2004/0071980 A1 | 4/2004 | McBain et al. | |
| 2004/0096630 A1 | 5/2004 | Sakurazi et al. | |
| 2004/0145092 A1 | 7/2004 | McCollum et al. | |
| 2004/0159969 A1 | 8/2004 | Truog et al. | |
| 2004/0161567 A1 | 8/2004 | Truog et al. | |
| 2004/0170793 A1 | 9/2004 | Linden et al. | |
| 2004/0197572 A1 | 10/2004 | Bell | |
| 2004/0200564 A1 | 10/2004 | Kinsey et al. | |
| 2004/0208998 A1 | 10/2004 | Steininger et al. | |
| 2004/0209057 A1 | 10/2004 | Enlow et al. | |
| 2004/0214007 A1 | 10/2004 | Brown et al. | |
| 2005/0042431 A1 | 2/2005 | Wagenblast | |
| 2005/0059309 A1 | 3/2005 | Tsotsis | |
| 2005/0069686 A1 | 3/2005 | Hoops | |
| 2005/0069698 A1 | 3/2005 | Eubanks et al. | |
| 2005/0084696 A1 | 4/2005 | Gaggar et al. | |
| 2005/0113194 A1 | 5/2005 | Pearson | |
| 2005/0136205 A1 | 6/2005 | Stoppelmann et al. | |
| 2005/0148404 A1 | 7/2005 | Ignatius | |
| 2005/0156358 A1 | 7/2005 | Bellefleur et al. | |
| 2005/0159060 A1 | 7/2005 | Shao | |
| 2005/0164008 A1 | 7/2005 | Rukavina | |
| 2005/0181203 A1* | 8/2005 | Rawlings et al. | 428/337 |
| 2005/0186415 A1 | 8/2005 | McCormick et al. | |
| 2005/0191490 A1 | 9/2005 | Ton-That et al. | |
| 2005/0214559 A1 | 9/2005 | Minoda et al. | |
| 2006/0046028 A1 | 3/2006 | Kaminski et al. | |
| 2006/0127666 A1 | 6/2006 | Fuchs | |
| 2007/0036929 A1* | 2/2007 | Baird et al. | 428/40.1 |
| 2007/0047099 A1 | 3/2007 | Clemens et al. | |
| 2007/0116933 A1 | 3/2007 | Kobayashi et al. | |
| 2007/0178239 A1 | 8/2007 | Kestell et al. | |
| 2008/0003406 A1 | 1/2008 | Steelman | |
| 2008/0199704 A1 | 8/2008 | Ho et al. | |
| 2008/0261014 A1 | 10/2008 | McGuire et al. | |
| 2008/0286576 A1 | 11/2008 | McGuire | |
| 2009/0186198 A1 | 7/2009 | McGuire | |
| 2009/0292057 A1 | 11/2009 | Handa et al. | |
| 2010/0059167 A1 | 3/2010 | McGuire, Jr. | |
| 2010/0062250 A1 | 3/2010 | Johnson et al. | |
| 2010/0068446 A1 | 3/2010 | McGuire, Jr. et al. | |
| 2011/0045306 A1 | 2/2011 | Johnson et al. | |
| 2011/0137006 A1 | 6/2011 | McGuire, Jr. et al. | |
| 2012/0255562 A1 | 10/2012 | McGuire, Jr. | |
| 2013/0316115 A1 | 11/2013 | Smith et al. | |
| 2014/0212674 A1 | 7/2014 | Ho et al. | |
| 2015/0099113 A1 | 4/2015 | Ho et al. | |
| 2015/0361306 A1 | 12/2015 | McGuire, Jr. | |

FOREIGN PATENT DOCUMENTS

| | | | |
|---|---|---|---|
| DE | 197 15 871 | 6/1998 | |
| DE | 10214827 | 10/2003 | |
| EP | 0 251 546 | 3/1992 | |
| EP | 0978374 | 2/2000 | |
| EP | 1 144 125 | 7/2003 | |
| EP | 1386950 A1 * | 2/2004 | |
| EP | 0 808 885 | 4/2004 | |
| EP | 1004608 | 10/2004 | |
| EP | 1 481 031 | 7/2007 | |
| EP | 1 874 541 | 11/2011 | |
| EP | 2 404 729 | 1/2012 | |
| EP | 1937475 | 9/2017 | |
| JP | 2169228 | 6/1990 | |
| JP | 6-143506 | 5/1994 | |
| JP | 07-052176 | 2/1995 | |
| JP | 07-074322 | 8/1995 | |
| JP | 2000-260252 | 9/2000 | |
| JP | 2001-253033 | 9/2001 | |
| JP | 2003-527258 | 9/2003 | |
| JP | 2004-307532 | 11/2004 | |
| JP | 2005-125506 | 5/2005 | |
| JP | 2005/335120 | 12/2005 | |
| WO | WO-90/11878 | 10/1990 | |
| WO | WO-92/02731 | 2/1992 | |
| WO | WO-92/16367 | 10/1992 | |
| WO | WO-92/22619 | 12/1992 | |
| WO | WO-93/24551 | 12/1993 | |
| WO | WO-94/013465 | 6/1994 | |
| WO | WO-96/10595 | 4/1996 | |
| WO | WO-97/28472 | 8/1997 | |
| WO | WO-98/37115 | 8/1998 | |
| WO | WO-01/29144 | 4/2001 | |
| WO | WO-02/31074 | 4/2002 | |
| WO | WO-2002/028636 | 4/2002 | |
| WO | WO-2003/002680 | 1/2003 | |
| WO | WO-2003/049942 | 6/2003 | |
| WO | WO-03/076542 | 9/2003 | |
| WO | WO-2004/067246 | 8/2004 | |
| WO | WO-2005032812 A2 * | 4/2005 | B32B 15/08 |
| WO | WO-2006/118883 | 11/2006 | |
| WO | WO-07/048141 | 4/2007 | |
| WO | WO-07/048145 | 4/2007 | |
| WO | WO-2007/048141 | 4/2007 | |
| WO | WO-2007/120188 | 10/2007 | |
| WO | WO-08/051629 | 5/2008 | |
| WO | WO-2008/0109733 | 9/2008 | |
| WO | WO-2015/195494 | 12/2015 | |
| WO | WO-2017/156507 | 9/2017 | |

OTHER PUBLICATIONS

"3M Paint Protection Film Builds Business through the SEMA Show," *3M Holding Fast*, 3M Automotive Division (St. Paul, MN), 1(25) (2002).

"3M Paint Protection Film: A Clear Alternative to Vehicle Bras or Guards," 3M Automotive Aftermarket Division 75-3467-9992-9, Minnesota Mining & Manufacturing Co. (St. Paul, MN) (2003).

"3M Polyurethane Protective Tape 8672/8672 GB Technical Data Sheet," Minnesota Mining & Manufacturing Co. (St. Paul, MN) Publication No. 78-9236-7045-5 (Nov. 2004).

"3M Polyurethane Protective Tape 8674/8674DL Technical Data Sheet," Minnesota Mining & Manufacturing Co. (St. Paul, MN) Publication No. 60-9700-0074-5 (Nov. 2005).

"Aircraft Painting," *KLM Engineering & Maintenance*, www.klm-em.com (Jun. 27, 2007).

*AircraftLog: Where Smart Solutions Take Flight*, PPG Industries, Inc. (Huntsville, AL) (May 2005), pp. 10-11 and 16.

"An Amazing New Automotive Finish Protection Film to Keep Your Vehicle in Showroom Condition . . . VentureShield," (http://www.venturetape.com/final/new_products.htm) VentureTape (Rockland, MA).

"Argotec 49510 Technical Data Sheet," Argotech, Inc. (Greenfield, MA) (Oct. 2003).

"Argotec Fills Industry Need with Thin, Aliphatic-Grade Polyurethane Films," *Argotec Press Release*, www.argotecinc.com (2006).

(56) References Cited

OTHER PUBLICATIONS

"Avery Dennison StoneShield Technical Data Sheet".
"Blade Protection Kits Keep Helicopters in the Air," *EngineeringTalk* (www.engineeringtalk.com/news/mmr/mmr102.html) (Sep. 16, 2005).
"CAB-O-SIL TS-720," Cabot Corporation (Billerica, MA) PDS-141 (Jan. 2006).
"ECLIPSE High Performance Exterior Topcoat," *Akzo Nobel Aerospace Coatings*, www.akzonobelaerospace.com.
"EPON Resin 828 Product Bulletin", Resolution Performance Products (Houston, TX) RP:3075-01 (Apr. 2002).
"EPON Resin 862 Product Bulletin," Resolution Performance Products (Houston, TX) RP:4048 (Mar. 2005).
"EPON Resin 863 Technical Data Sheet," Hexion Specialty Chemicals (Houston, TX) RP:4041 (Jun. 2004).
"EPON Resin Structural Reference Manual—EPON Resins—EPI-CURE Curing Agents—Heloxy Modifiers," Resolution Performance Products (Houston, TX), pp. 3i to 3-6 (2001).
"EPON Resins and Modifiers," Resolution Performance Products SC:3059-01 (2002).
"Epoxy Curing Agents and Modifiers: Amicure CG-1200 Curing Agent," Air Products and Chemicals (Allentown, PA) Publication No. 125-9416.7.
"Epoxy Curing Agents and Modifiers: Amicure UR Curing Agent," Air Products and Chemicals (Allentown, PA) Publication No. 125-9416.11.
"Epoxy Curing Agents and Modifiers: Ancamine 2441 Curing Agent," Air Products and Chemicals (Allentown, PA) Publication No. 125-04-017-GLB (2004).
"Ford Pressure Sensitive Performance Testing (Venture Tape) for Test Materials: 7510 and 7514," ACT Laboratories, Inc. (Hillsdale, MI), published at: http://www.invisiblepatterns.com/pdf/AIN154314C.pdf, (Dec. 30, 2005).
"Improved Scotchgard Paint Protection Film Uses Latest 3M Technology," *3M News: SEMA Show 2005*, (Nov. 1, 2005).
"Paint Protection Film FAQ's," previously published at: http://enprodistributing.com/products/protection/faq.htm, (Jul. 12, 2005).
"Polyurethane Coatings for Automotive Exteriors," published at: http://www.bayermaterialscienceafta.com/industries/automotive/coatings.html#3.
"Scotchgard Paint Protection Film SGPF6 for Professional Applicators," 3M Technical Data Sheet 75-3469-1065-8, Minnesota Mining & Manufacturing Co. (St. Paul, MN) (Apr. 2004).
"Scotchgard Paint Protection Film: Application Guide for Professional Applicators," 3M Technical Update 75-3469-1102-9, Minnesota Mining & Manufacturing Co. (St. Paul, MN) (Apr. 2004).
"Test Report—Venture Shield 7510," Bodycote Materials Testing Met-Chem Laboratory, published at: http://www.invisiblepatterns.com/pdf/067682.pdf, Letter Dated Jan. 14, 2003—Report No. 067682 (Jan. 14, 2003).
"Venture Shield Paint Protection 7510," VentureTape (Rockland, MA), published at: http://www.venturetape.com/final/automotive_products.asp?id=609 (Jul. 12, 2005).
"Venture Shield—Paint Protection 7512", VentureTape (Rockland, MA), published at: http://www.venturetape.com/final/automotive_products.asp?id=610 (Jul. 12, 2005).
*Engineering EDGE*, Air France KLM (Jan. 2006).
Umamaheswaran, Venkatakrishnan et al., "New Weatherable Film Technology to Eliminate Painting of Automotive Exteriors," *Society of Automotive Engineers*: 2001-01-0443, (2001).
"3M FTA 9055 J—3M™ Premium Plus Blackout Film with Comply™ Feature," Technical Data Sheet FTA 9055 J E_01/MW, Rev. 1, Ref. TL-10177, retrieved on Sep. 12, 2017 from http://multimedia.3m.com/mws/media/880023O/3m-premium-plus-blackout-film-with-comply-feature.pdf (Jun. 2008).
"3M Paint Replacement Film F577," Technical Data Sheet, retrieved on Sep. 12, 2017 from https://multimedia.3m.com/mws/media/514553O/3mtm-paint-replacement-film-f577.pdf (Mar. 2017).
"3M™ Paint Replacement Films with Comply™ Adhesive Performance," Technical Bulletin, retrieved on Sep. 12, 2017 at http://multimedia.3m.com/mws/media/557534O/3m-paint-replacement-film-with-comply-adh-perf-tech-bulletin.pdf (Nov. 2008).
"Laminating Problems and Solutions," Mactac Technical Bulletin 7.8, vol. 2, retrieved on Sep. 13, 2017 from http://www.mactac.eu/datas/files/Technical%20Bulletin%207%208%20Laminating%20problems%20%20solutions.pdf (Sep. 2012).
"SABIC Innovative Plastics™ Lexan SLX Resin," SABIC-PLA-829, retrieved on Sep. 12, 2017 from http://www.pod-sabic-ip.com/KBAM/Reflection/Assets/Thumbnail/8457_15.pdf (Dec. 2008).

\* cited by examiner

PAINT REPLACEMENT FILMS, COMPOSITES THEREFROM, AND RELATED METHODS

BACKGROUND OF THE INVENTION

The present invention relates generally to films and composite articles for paint replacement and methods related to the same.

Painted surfaces are commonly used in many different types of applications. Painted surfaces can not only improve aesthetic properties of a surface, but they can also improve functional properties of underlying surfaces and help protect the same. One such application is in the transportation industry, where exterior painted surfaces are typically exposed to a variety of environments, some of which can be very harsh on the surface. Examples of articles in the transportation industry having such painted surfaces include vehicles providing transportation over land, in the water, and in the air. Such vehicles include aircraft and motorized vehicles like automobiles and trucks. The paint on such surfaces can function to protect the underlying surface from damage due to that exposure. However, the paint itself must also be durable to withstand repeated exposure to such damaging environments.

Painting exterior surfaces on vehicles poses many challenges, not only due to the amount of surface area typically requiring painting and the often uneven topography of such surfaces, but also due to increasingly stringent environmental regulations. For example, there is a desire for and increasingly regulations requiring a reduction in Volatile Organic Component (VOC) emissions, particularly in industries utilizing significant amounts of paint and other organic chemicals. VOC emission reduction and water conservation, both associated with conventional painting processes, are therefore increasingly important environmental considerations.

A further consideration associated with painting exterior surfaces on vehicles, particularly in the transportation industry, is overall weight. The presence of paint on a surface, while increasing the aesthetic and functional properties of the surface, also increases the weight of the article to which it is applied. In the transportation industry, additional weight leads to consumption of excess fuel and restrictions on the number of passengers or amount of cargo that an associated vehicle can safely and efficiently transport.

Further, a unique consideration associated with painting or otherwise covering exterior surfaces on aircraft and similar vehicles is the impact of the relatively high vehicle speeds on the surface of the vehicle and any coatings or coverings thereon. For example, wind resistance associated with travel at high speeds can make it difficult to retain uniform and adequate adherence of such coatings or coverings on a vehicle's surface. Thus, coatings and coverings developed for application to exterior surfaces of vehicles traveling on, for example, land are often not adequate to withstand the challenging conditions associated with higher speeds of travel through air.

To overcome many of the challenges associated with painting exterior surfaces of vehicles using conventional methodology, a number of paint replacement technologies have been developed so that use of paint can be minimized or avoided. For example, by infusing plastic with pigment, one commercially available product allows car manufacturers to remove the painting process from automobile production lines. Such a product, which comprises a resin for formation of surfaces that are traditionally painted, is marketed under the LEXAN SLX trade designation by General Electric Company of Fairfield, Conn. It is advertised that one can now achieve a high-gloss, sun- and scratch-resistant finish without the need for paint when using such a resin.

Other alternatives to using conventional paint include adherence of a paint replacement film or sheet to a surface. For example, 3M Company of St. Paul, Minn. markets paint replacement films and tapes. It is advertised that such films were created while developing top-coat paint replacement technology for use on the demanding exterior surfaces of aircraft. Further, it is advertised that such films couple the low surface energy performance of fluoropolymer films with a range of self stick and curing adhesives. See also U.S. Patent Publication No. 2007/0047099 and U.S. Pat. No. 7,141,303, both of which are assigned to 3M Innovative Properties Company.

U.S. Pat. No. 5,965,256, also assigned to 3M Innovative Properties Company, describes protective and decorative film-based coatings for surfaces exposed to adverse environments, including outdoor weather, solvents, dirt, grease, marine environments, and the like. One film exemplified therein is described as an aircraft paint replacement film. Such films include interpenetrating polymer networks, described as preferably acrylate-urethane interpenetrating polymer networks (IPN). They may optionally have a layer of a highly fluorinated polymer at the outermost, exposed surface. The substrate on which the films are adhered can be a cured adhesive, preferably a cured pressure-sensitive adhesive (PSA), in which case the fluoro-containing polymer layer is said to typically be situated between the PSA layer and the IPN layer. Alternatively, the substrate can be a surface to be protected from exposure to weather, chemical exposure, graffiti, or the like on, for example, a vehicle such as an automobile, a truck, a boat, or an aircraft; an outdoor sign; or a building's exterior.

U.S. Pat. No. 6,475,616, also assigned to 3M Innovative Properties Company, describes paint replacement appliqués comprising: a backing comprising a fluorinated polymer having two treated surfaces, an adhesive layer on one treated surface and a cured urethane coating layer on the other treated surface. The cured urethane coating layers on the appliqués are made from the reaction products of a hydroxy-containing material (base material) and isocyanate-containing material (activator). The curable compositions having the hydroxy- and isocyanate-containing materials may also further comprise a colorant. The curable compositions usually contain solvents and may also further contain other additives such as UV-stabilizers, antioxidants, corrosion inhibitors, curing catalysts, and the like. It is stated that, when dried and cured, the urethane coating layer provides a conformable urethane coating layer that has improved gloss retention and gouge and scratch resistance as compared to, for example, a fluoropolymer layer alone.

However, these 3M films have not proven reliable in maintaining their integrity and adherence to the underlying surface when exposed to the environment under expected operating conditions. A contributor to this undesirable quality is the nature of bonding between the film and underlying surface (i.e., bonds relying on Van Der Waals forces, such as those typically associated with use of pressure sensitive adhesives, as opposed to stronger bonds, such as covalent bonds). Further, it is believed that inclusion of fluoropolymer layers in such films contributes to interlayer delamination due to its low surface energy and inadequate bonding to adjacent layers. Still further, if additional coatings or coverings are desired to be applied to the exterior surface of such films, the low surface energy fluoropolymer films therein make it challenging to find a coating or covering that will adequately adhere thereto.

3M Company also markets films for application over painted surfaces that are intended to help maintain the beauty and integrity of such surfaces. These films are marketed under the SCOTCHGARD PAINT PROTECTION FILM trade designation. The urethane films are described as being useful on vulnerable exterior painted surfaces such as leading hood edges, fender end caps and rocker panels to protect against stone chips, bug damage, abrasion and weathering. The film is advertised as being transparent and nearly invisible, such that it does not alter a vehicle's appearance.

U.S. Pat. No. 7,141,294, assigned to 3M Innovative Properties Co. describes a decorative film using no appreciable amount, or no amount, of polyvinyl chloride. This decorative film comprises a substrate, an adhesive layer for sticking the decorative film to an adherend formed on one surface of the substrate, a printed layer provided with a printed decorative pattern or character information formed on the other surface of the substrate, and a top clear layer for protecting the printed layer. The substrate is formed from an ethylene-(meth)acrylic acid copolymer. The top clear layer used as an outer-most layer is preferably made of a material which is superior in weatherability and water resistance and has high transparency (e.g., colorless coating compositions such as fluororesins, thermosetting urethanes, and ultraviolet-curing compositions). The decorative film is described as having flexibility for adhering, ink adhesion, water resistance, and weatherability with good balance. It is also described as being suitable for various adherends, particularly for adhering to buildings or vehicles used outdoors, including curved surfaces such as the body of vehicles.

U.S. Pat. No. 5,034,275 refers to a paint-coated sheet material. The material purportedly comprises a flexible and stretchable thermoplastic polyester carrier film, a stretchable aqueous polyurethane paint layer, a stretchable transparent crosslinked polyurethane topcoat layer and, disposed between the carrier film and the paint layer, a thin tie layer formed by coating an aqueous dispersion of a neutralized copolymer of ethylene and an ethylenically unsaturated carboxylic acid on the carrier film. The thickness of the crosslinked polyurethane topcoat layer is stated to be substantially thicker than the paint layer, which is stated to have a thickness of 12 to 80 microns. In that regard, the topcoat layer has a thickness in the range of about 0.02 to 0.25 millimeter (20 microns to 250 microns), preferably from about 0.03 (30 microns) to 0.1 millimeter (100 microns).

U.S. Pat. No. 5,114,789 describes a decorative sheet material having a transparent topcoat that can be bonded to various substrates, such as exterior automotive panels, as a protective and decorative coating. The sheet material comprises a thin carrier film, a paint layer adhered to one surface of the carrier film, and a crosslinked topcoat layer. That topcoat layer is stated to be "extremely thick"—at least 0.1 millimeter (100 microns)—in embodiments described therein.

U.S. Pat. No. 5,242,751 describes a paint composite article including a thermally deformable carrier film having, on its first major surface, an adhesive layer and, on its second major surface, a paint layer consisting of a pigmented basecoat covered by a polyurethane topcoat layer.

U.S. Pat. No. 5,268,215 describes a paint-coated film purportedly having good mar resistance. A polyurethane paint layer is coated on a polymeric carrier film. Coated on the upper surface of the paint layer is a polyurethane clearcoat layer, which is then coated with a polyurethane-siloxane topcoat layer. The film can purportedly be thermoformed, stretched, and bonded adhesively to auto body parts, boats, household appliances, and other substrates as protective and decorative coverings having a basecoat-clearcoat appearance.

U.S. Pat. No. 5,468,532 describes a multi-layer graphic article with a color layer. It is based on a polymeric film that is covered with a protective surface layer to purportedly make the article weatherable and resistant to chemical exposure. The protective surface layer is described as being a polyurethane-based material in an exemplary embodiment.

U.S. Pat. No. 6,132,864 describes a painted plastic film, which is coated with two or more coats of certain materials. It consists of a base plastic film, which is first coated with a filler composition, followed by coating with a pigmented paint, and then coating with a transparent plastic film. The base plastic film can be a polyolefin, a polyamide, a polyurethane, a polyester, a polyacrylate, a polycarbonate or mixture of different polymeric substances. The filler composition is described as a composition containing a binder and crosslinking agent among other components. The pigmented paint coating is described as a topcoat comprising a polymeric binder, with or without a crosslinking agent, and a pigment or mixture of pigments. The transparent plastic film is described as being one of the same materials suitable for use as the base film. The multi-layer sheets described therein purportedly have good resistance to stone chipping and corrosion.

Despite the number of paint replacement technologies, conventional technology has not satisfactorily addressed paint replacement in all situations, particularly applications involving vehicles used for air transportation. Not only are adequate adhesion and durability issues for exterior surfaces on such vehicles due to their typical exposure to high wind resistance, but other issues exist as well. For example, many aircraft and other transportation vehicles increasingly rely on use of composite materials for surfaces to which conventional paint replacement materials are adhered. Conventional paint replacement materials, however, often do not adhere as well to composite materials as they do to individual materials.

It is known that the ability of conventional paint replacement materials to adhere adequately to all surfaces, including those formed from composite materials, and provide the desired aesthetic and functional properties is often inadequate. Not only is it desirable for a material to adhere adequately to a surface, but it is also desirable to be able to remove the material easily when desired. In the case of an aircraft, for example, company logos and designs often change, which leads to a desire to refinish aircraft displaying outdated logos and designs. This is particularly prevalent in the case of leased aircraft, which often undergo multiple and repeated changes of possession and, thus, changes in associated individual or company logos and designs. Typically paint replacement films present on a surface must first be removed when refinishing the surface. Many conventional films, however, are not easily removable as the layers therein are prone to delamination. Delamination of the paint replacement film when removing the same from a surface can significantly complicate the refinishing process.

Even when paint, as opposed to a paint replacement film, is present on a surface to be refinished, the refinishing process can be problematic. Refinishing painted surfaces typically entails sanding the surface in preparation for applying a fresh coat of paint thereon. Composite material surfaces must usually rely on sanding to remove undesired paint thereon when refinishing because most chemical strippers are not able to be used on composite materials. Sanding surfaces formed from composite materials, however, is also not desirable due to the likelihood that such sanding will result in damage to (e.g., breakage of) the composite's reinforcement material (especially when that reinforcement material comprises fibers).

As noted, a number of problems are inadequately addressed by conventional paint replacement technologies. Thus, alternative paint replacement technologies are desired.

BRIEF SUMMARY OF THE INVENTION

Paint replacement films of the invention comprise at least one adhesive layer; at least one pigmented layer; and at least one polymer layer that is essentially free of low surface energy materials. According to an exemplary embodiment, the paint replacement film excluding the at least one adhesive layer has a thickness of about 25 microns to about 50 microns. It has been found that use of a relatively thin paint replacement film contributes to superior flexibility, allowing paint replacement films of the invention to be effectively used in covering articles (e.g., aircraft) having curved or other non-planar surfaces.

In order to reduce the possibility of interlayer delamination upon removal of the film from a surface as desired, adjacent layers within the paint replacement film are covalently bonded to each other in accordance with one embodiment of the invention. For example, surface tension of each layer within the paint replacement film can be within about 5 dynes per centimeter of surface tension of adjacent layers therein.

The pigmented layer may be continuous or discontinuous. In one embodiment, the pigmented layer comprises ink. Preferably, the pigmented layer has a maximum thickness of about 25 microns. According to an exemplary embodiment, the pigmented layer has a thickness of about 5 microns to about 8 microns.

In an exemplary embodiment, the polymer layer is polyurethane-based. Preferably the polymer layer has a thickness of about 10 microns to about 50 microns. According to an exemplary embodiment, the polymer layer has a thickness of about 25 microns or less.

In one embodiment, the adhesive layer comprises a pressure-sensitive adhesive (e.g., a (meth)acrylate). Preferably, the adhesive layer has a thickness of about 5 microns to about 150 microns. According to an exemplary embodiment, the adhesive layer has a thickness of about 30 microns to about 100 microns. In a further embodiment, the adhesive layer has a thickness of about 25 microns or less.

Paint replacement films of the invention are useful when applied to a variety of articles (e.g., a motorized vehicle such as an aircraft). In one embodiment, such an article comprises at least one surface having on at least a portion thereof a paint replacement film of the invention.

In addition, paint replacement composite articles of the invention comprise a paint replacement film and a topcoat on a surface of the paint replacement film opposite the adhesive layer. In an exemplary embodiment, the topcoat comprises a polyurethane-based material. In another exemplary embodiment, the topcoat comprises a clearcoat. While the topcoat within paint replacement composite articles can comprise any suitable thickness, preferably the topcoat is about 20 microns to about 40 microns thick.

Methods of the invention include a method of protecting a surface, the method comprising: adhering a paint replacement film to at least a portion of at least one exterior surface of an article, and applying a topcoat to essentially the entire exposed exterior surface of the article, except for those surfaces where the topcoat would detract from function of the underlying surface or article. In an exemplary embodiment, the article comprises an aircraft.

DETAILED DESCRIPTION OF THE PREFERRED EMBODIMENTS OF THE INVENTION

The phrase "paint replacement film" encompasses films including essentially one uniform color throughout as well as films which, by themselves or in combination with other paint replacement films, include graphics, patterns, and other non-uniformly dispersed color variations throughout. Paint replacement films of the invention generally include a polymer layer and an adhesive layer with a pigmented layer disposed therebetween and/or a pigmented layer disposed on the exterior surface of the polymer layer. The pigmented layer provides the uniform or non-uniform color throughout the film.

In a preferred embodiment, the polymer layer, the pigmented layer, and the adhesive layer are selected to be chemically compatible with each other to improve interlayer adhesion of the paint replacement film. For example, material properties contributing to high chemical affinity of the various layers with each other are identified and selected according to this embodiment of the invention. According to one aspect of this embodiment, the surface tension of each layer within the paint replacement film is within about 5 dynes per centimeter of the surface tension of adjacent layers therein. According to another aspect of this embodiment, the chemistries of adjacent layers within the paint replacement film are selected such that covalent bonds form between the layers. Although primers may be used between adjacent layers, they are not required in paint replacement films according to the invention. Each of the layers is described in further detail below.

Adhesive Layer

While more than one adhesive layer can be used in paint replacement films of the invention or the adhesive layer can comprise more than one distinct adhesive, the following description is made with reference to one such layer and type of adhesive within that layer for simplicity only. Recognize that, if multiple adhesives or adhesive layers are used, each adhesive or adhesive layer can be the same or different.

The adhesive layer comprises any suitable material. According to one embodiment, the adhesive layer generally comprises a base polymer with one or more additives. While any suitable chemistry can be used for the base polymer in the adhesive layer, (meth)acrylate (i.e., acrylate and methacrylate) chemistry is preferred. In particular, an adhesive based on 2-ethyl hexyl acrylate, vinyl acetate, and acrylic acid monomers polymerized as known to those skilled in the art can be used as the base polymer. However, other suitable chemistries are known to those skilled in the art and include, for example, those based on synthetic and natural rubbers, polybutadiene and copolymers thereof, polyisoprene and copolymers thereof, and silicones (e.g., polydimethylsiloxane and polymethylphenylsiloxane). In a preferred embodiment, the adhesive layer comprises a pressure-sensitive adhesive (PSA).

Any suitable additives can optionally be used in conjunction with the base polymer in the adhesive layer. For example, stabilizers (e.g., antioxidants, heat stabilizers, and UV-stabilizers), crosslinkers (e.g., aluminum or melamine crosslinkers), corrosion inhibitors, tackifiers, plasticizers, photocrosslinkers, colorants, fillers, and other conventional adhesive additives as known to those of ordinary skill in the art can be incorporated into the adhesive layer. If desired, an adhesion promoter may be included in the adhesive layer. However, in preferred embodiments, the material comprising the adhesive layer is selected to be chemically compatible with adjacent layers of the paint replacement film. Thus, an adhesion promoter is not required according to preferred embodiments of the invention.

Preferably, the adhesive layer is essentially free of components that may tend to migrate to the outer surface of the paint replacement film or to an interface therein, where such components may promote interlayer delamination or otherwise detrimentally affect the adherence of the paint replacement film to adjacent surfaces or layers. The adhesive layer is also preferably resistant to chemicals to which it may be exposed during use of the paint replacement film. For example, it is preferred that the adhesive layer is resistant to degradation by water and hydraulic fluids (e.g., those sold by TBM, Inc. of St. Louis, Mo. under Solutia, Inc.'s SKYDROL trade designation).

The adhesive layer comprises any suitable thickness. In one embodiment, the adhesive layer has a thickness of about 5 microns to about 150 microns. In a further embodiment, the adhesive layer has a thickness of about 30 microns to about 100 microns. In an exemplary embodiment, the adhesive layer is about 25 microns thick or less. However, the thickness of the adhesive layer can vary substantially without departing from the spirit and scope of the invention.

Pigmented Layer

While more than one pigmented layer can be used in paint replacement films of the invention, the following description is made with reference to one such layer for simplicity only. Recognize that, if multiple pigmented layers are used, each pigmented layer can be the same or different.

The pigmented layer comprises any suitable material and provides desired aesthetics when the paint replacement film is adhered to a surface. The pigmented layer can be a continuous or discontinuous layer. Note that the pigmented layer may consist essentially of graphics, patterns, and the like, which results in the layer being a discontinuous layer and/or a non-planar layer.

In an exemplary embodiment, the pigmented layer comprises ink. Any suitable commercially available ink can be used. Non-limiting examples of suitable inks include pigmented acrylic ink (including pigmented fast-dry acrylic ink), pigmented urethane ink, epoxy ink, and a urethane enamel coating such as that sold by PRC Desoto International, Inc. of Glendale, Calif. under the trade designation, DESOTHANE HS.

The pigmented layer generally comprises at least one material imparting desired color to the layer or portion thereof. Any suitable additives can optionally be used in the pigmented layer. For example, stabilizers (e.g., antioxidants, heat stabilizers, and UV-stabilizers), crosslinkers (e.g., aluminum or melamine crosslinkers), corrosion inhibitors, plasticizers, photocrosslinkers, additional colorants, fillers, and other conventional additives as known to those of ordinary skill in the art can be incorporated into the pigmented layer. If desired, an adhesion promoter may be included in the pigmented layer. However, in preferred embodiments, the material comprising the pigmented layer is selected to be chemically compatible with adjacent layers of the paint replacement film. Thus, an adhesion promoter is not required according to preferred embodiments of the invention.

Preferably, the pigmented layer is essentially free of components that may tend to migrate to the outer surface of the paint replacement film or to an interface therein, where such components may promote interlayer delamination or otherwise detrimentally affect the adherence of the paint replacement film to adjacent surfaces or layers. The pigmented layer is also preferably resistant to chemicals to which it may be exposed during use of the paint replacement film. For example, it is preferred that the pigmented layer is resistant to degradation by water and hydraulic fluids (e.g., those sold by TBM, Inc. of St. Louis, Mo. under Solutia, Inc.'s SKYDROL trade designation), particularly when the pigmented layer comprises an outer layer of the paint replacement film.

The pigmented layer comprises any suitable thickness. In an exemplary embodiment, the pigmented layer has a maximum thickness of about 25 microns, preferably about 5 microns to about 8 microns.

Polymer Layer

While more than one polymer layer can be used in paint replacement films of the invention or the polymer layer can comprise more than one distinct polymer, the following description is made with reference to one such layer and type of polymer within that layer for simplicity only. Recognize that, if multiple polymers or polymer layers are used, each polymer or polymer layer can be the same or different.

The polymer layer comprises any suitable material. For example, the polymer layer may comprise a urethane film, an acrylic film, an epoxy film, or a polyester film (e.g., that available from DuPont under the MYLAR trade designation). Although generally not preferred due to its lack of flexibility, the polymer layer can also be a vinyl, such as polyvinyl chloride (PVC), polyvinylidene fluoride (PVDF), or general polyvinyl fluoride (PVF) (e.g., that available from DuPont under the TEDLAR trade designation). Nevertheless, generally the polymer layer is essentially free of low surface energy materials (e.g., silicones and fluoropolymers), which tend to promote interlayer delamination.

The polymer layer is preferably polyurethane-based in that it comprises any suitable polyurethane material. For simplicity, the term "polyurethane" is sometimes used herein to reference polymers containing urethane (also known as carbamate) linkages, urea linkages, or combinations thereof (i.e., in the case of poly(urethane-urea)s). Thus, polyurethanes of the invention contain at least urethane linkages and, optionally, urea linkages. Many commercially available polyurethanes are available and suitable for use as polyurethane-based polymer layers according to the invention. For example, polyurethanes are available from Thermedics (Noveon, Inc.) of Wilmington, Mass. under the TECOFLEX trade designation (e.g., CLA-93AV) and from Bayer MaterialScience LLC of Pittsburgh, Pa. under the TEXIN trade designation (e.g., an aliphatic, ester-based polyurethane available under the trade designation, TEXIN DP7-3008).

Any suitable additives can optionally be included in the polymer layer. For example, stabilizers (e.g., antioxidants, heat stabilizers, and UV-stabilizers), crosslinkers (e.g., aluminum or melamine crosslinkers), binders, corrosion inhibitors, plasticizers, photocrosslinkers, colorants, fillers, and other conventional additives as known to those of ordinary skill in the art can be incorporated into the polymer layer. If desired, an adhesion promoter may be included in the polymer layer. However, in preferred embodiments, the material comprising the polymer layer is selected to be chemically compatible with adjacent layers of the paint replacement film. Thus, an adhesion promoter is not required according to preferred embodiments of the invention.

The polymer layer may be clear or pigmented depending on the application. When the polymer layer is clear, the pigmented layer is typically provided between the polymer layer and the adhesive layer. Alternatively or in conjunction with another pigmented layer, when the polymer layer is clear, a pigmented layer can be provided on the outer surface of the polymer layer. When the polymer layer is pigmented, the pigmented layer is generally provided on the outer surface of the polymer layer. In this embodiment, the polymer layer can be impregnated with a material (e.g., titanium dioxide) that causes the polymer layer to function as a reflective background, bringing out the color of the overlying pigmented layer.

Preferably, the polymer layer is essentially free of components that may tend to migrate to the outer surface of the paint replacement film or to an interface therein, where such components may promote interlayer delamination or otherwise detrimentally affect the adherence of the paint replacement film to adjacent surfaces or layers. The polymer layer is also preferably resistant to chemicals to which it may be exposed during use of the paint replacement film. For example, it is preferred that the polymer layer is resistant to degradation by water and hydraulic fluids (e.g., those sold by TBM, Inc. of St. Louis, Mo. under Solutia, Inc.'s SKYDROL trade designation). It is also preferred that the polymer layer is thermally resistant to temperatures to which it may be exposed during use of the paint replacement film. For example, exterior surfaces or coverings of an aircraft are often exposed to temperatures ranging from about −55° C. to about +75° C. Thus, it is preferred that the polymer layer is resistant to degradation when exposed to such temperature variations.

The polymer layer comprises any suitable thickness. In one embodiment, the polymer layer has a thickness of about 10 microns to about 50 microns. In an exemplary embodiment, the polymer layer is about 25 microns thick or less. It has been found that use of a relatively thin polymer layer contributes to superior flexibility of the paint replacement film. Such flexibility allows paint replacement films of the invention to be effectively used in covering articles (e.g., aircraft) having curved or other non-planar surfaces.

Optional Topcoat

According to a preferred embodiment of the invention, a topcoat is applied to the exterior surface of the paint replacement film on a side opposite the adhesive. In this embodiment, the topcoat overlays the paint replacement film to form a paint replacement composite article.

In one embodiment, a topcoat is applied (e.g., by spraying or painting it) on the paint replacement film after adherence of the paint replacement film to an underlying surface. Preferably, the topcoat is applied such that no paint replacement film is exposed to the environment when the composite article is adhered to a surface for use. Still further, when more than one paint replacement film is used in combination with others on a surface, the topcoat preferably covers and protects seams between adjacent paint replacement films from exposure to the environment.

The topcoat can comprise any suitable chemistry. In general, the topcoat provides one or more properties including the following: environmental resistance, chemical resistance, abrasion resistance, scratch resistance, optical transparency, and other often desirable properties. According to an exemplary embodiment, the topcoat comprises a material with the following properties: non-yellowing, gloss retention (e.g., maintaining of gloss on the order of about 80 to about 90 gloss units), and extensibility.

In an exemplary embodiment, the topcoat comprises a polyurethane-based material. Many suitable topcoats are commercially available, including for example, polyurethane coatings sold by PRC Desoto International, Inc. of Glendale, Calif. under the DESOTHANE HS trade designation (e.g., DESOTHANE HS BAC 900 (CA8000/B900A or CA8000/B900B)) or those sold by Akzo-Nobel Aerospace Coatings of Waukegan, Ill. under the ECLIPSE trade designation (e.g., ECLIPSE BAC 900).

Preferably, chemistry of the topcoat is selected to facilitate its bonding to the underlying paint replacement film. According to one aspect of this embodiment, the surface tension of the outer layer of the paint replacement film is within about 5 dynes per centimeter of the surface tension of the overlying topcoat. According to another aspect of this embodiment, the topcoat comprises excess isocyanate-functional moieties reactive with excess isocyanate-reactive moieties in the exterior layer of the paint replacement film on which it is applied. According to this aspect of the invention, covalent bonds form between the topcoat and paint replacement film. Such covalent bonds are typically more robust than other types of bonds (e.g., those relying on Van Der Waals forces, such as those typically associated with use of pressure sensitive adhesives) and are, therefore, preferred.

Any suitable additives can optionally be included in the topcoat. For example, stabilizers (e.g., antioxidants, heat stabilizers, and UV-stabilizers), crosslinkers (e.g., aluminum or melamine crosslinkers), binders, corrosion inhibitors, plasticizers, photocrosslinkers, colorants, fillers, and other conventional additives as known to those of ordinary skill in the art can be incorporated into the topcoat. The topcoat layer may be clear or pigmented depending on the application. When clear, which is preferred so that the pigmented layer is outwardly visible, the topcoat is referred to as a "clearcoat."

As applied, the topcoat is preferably resistant to chemicals to which it may be exposed during use of the paint replacement composite article. For example, it is preferred that the topcoat is resistant to degradation by water and hydraulic fluids (e.g., those sold by TBM, Inc. of St. Louis, Mo. under Solutia, Inc.'s SKYDROL trade designation). It is also preferred that the topcoat is thermally resistant to temperatures to which it may be exposed during use of the paint replacement composite article. For example, exterior surfaces or coverings on an aircraft are often exposed to temperatures ranging from about −55° C. to about +75° C. Thus, it is preferred that the topcoat is resistant to degradation when exposed to such temperature variations.

The topcoat is applied on the exterior surface of the paint replacement film to a desired thickness according to coating methodology known to those skilled in the art. In an exemplary embodiment, the total dry thickness of the applied topcoat is about 10 microns to about 60 microns, preferably about 20 microns to about 40 microns. Depending on the desired thickness, the topcoat can be applied in one or more coating layers. For example, two individual coating layers comprise the topcoat according to one embodiment. In this embodiment, each coating layer is sprayed wet, but not so wet as to flow unevenly across the surface and create a significantly non-uniform topcoat.

While this embodiment employing a topcoat is described with reference to the improved paint replacement films of the invention, recognize that this aspect of the invention is applicable to use with any conventional paint replacement film or similar underlying material.

Applications

Until the paint replacement film is adhered to a surface, it can be stored with an optional release liner adjacent the adhesive layer and with an optional carrier on the opposite side thereof. The selection and use of such carriers and liners is within the knowledge of one of ordinary skill in the art.

When applied, paint replacement films can cover substantially all of or select portions of exterior surfaces on a variety of articles, such as transportation vehicles. The paint replacement film can be applied to a surface according to principles and methodologies understood by those of ordinary skill in the art. For example, the release liner, if present, is first removed. Then, the surface to which the paint replacement film is to be adhered can optionally be sprayed with a cleaning and/or anti-slip agent (e.g., a mixture of 3 parts water to 1 part isopropanol). The adhesive layer of the paint replacement film may also be sprayed with such an agent. Still further, once the paint replacement film is positioned over the surface to which it is to be applied, the film may also be sprayed with such an agent. Thereafter, the paint replacement film is firmly adhered to the underlying surface using, for example, a squeegee. Excess cleaning and/or anti-slip agent is then removed from the surface and the film is allowed to set for a time sufficient to prevent inadvertent removal of the film upon removal of any carrier used in conjunction therewith. The carrier, if present, is then removed.

After they are adhered to a surface as known to those of ordinary skill in the art, an exemplary method of which is described above, the optional topcoat is applied in one embodiment. If desired, the outer layer of the paint replacement film is primed with a cleaning agent (e.g., a mixture of 3 parts water to 1 part isopropanol) to remove any contamination before the optional topcoat is applied.

Recognize that, when used, the topcoat may be applied over a discrete portion of the paint replacement film adhered to a surface. It is preferred, however, that the topcoat is applied to encapsulate essentially all of the paint replacement film. When applied to an aircraft, for example, it is particularly preferred to apply the topcoat to essentially the entire exposed surface of the aircraft, except for those surfaces where the topcoat would detract from the function of the underlying surface (e.g., as in the case of windows, which may be taped or otherwise covered during application of the topcoat to prevent coating thereof).

Paint replacement films of the invention are useful for application to a wide variety of exterior surfaces. For example, such paint replacement films find particularly beneficial use when adhered to exterior surfaces of many transportation vehicles. In an exemplary embodiment, paint replacement films of the invention are effectively and durably adhered to the exterior surface of an airborne transportation vehicle, which vehicles are typically subject to extreme wind resistance and other challenging environmental conditions when in use. For example, the paint replacement films are capable of being effectively and durably adhered to the exterior surface of an aircraft. The paint replacement films are also capable of being efficiently removed from the surface of an aircraft when repair is needed due to the increased interlayer adhesion, which promotes removability of the paint replacement film in a unitary piece when desired.

Not only do paint replacement films of the invention exhibit improved resistance to interlayer delamination or inadequate adhesion during use, but they also have improved flexibility as compared to conventional paint replacement films. This flexibility, which is created in part due to the overall thin dimensions of the paint replacement film (e.g., about 25 microns to about 50 microns thick, not including the adhesive layer), facilitates adequate and durable adherence of the film to curved or otherwise non-planar surfaces.

Use of such paint replacement films and related articles facilitates obtainment of many benefits as compared to use of traditional paint. These benefits include, for example, a reduction in VOC emissions generated during manufacture of the article to which such composite articles are applied, improved water conservation during such manufacture, decreased weight of the manufactured articles, more consistent surface quality (e.g., including consistent weight distribution throughout the surface onto which the paint replacement film is applied) in such manufactured articles, and other benefits.

EXAMPLES

Exemplary embodiments and applications of the invention are described in the following non-limiting examples and related testing methods.

Example 1

A paint replacement film was prepared with the following order of construction and dimensions: a 20-micron thick, clear polyurethane film, a pigmented layer comprising images and characters, a 30-micron thick acrylic adhesive, and a 160 grams per square meter (gsm) poly-coated kraft paper release liner. The paint replacement film was prepared for use on an aircraft. Once applied to the exterior surface of an aircraft, a clearcoat can be applied as described herein. For example, a topcoat (e.g., clearcoat) having a thickness of about 20 to about 40 microns can be wet-applied over the paint replacement film.

Example 2

A paint replacement film was prepared with the following order of construction and dimensions: a 10-micron thick, clear polyurethane film, a pigmented layer comprising images and characters, a 15-micron thick acrylic adhesive, and a 160 grams per square meter (gsm) poly-coated kraft paper release liner. The paint replacement film was prepared for use on an aircraft. This film is preferred for application to portions of an aircraft with highly curved surfaces (e.g., engine nacelle). Once applied to the exterior surface of an aircraft, a clearcoat can be applied as described herein. For example, a topcoat (e.g., clearcoat) having a thickness of about 20 to about 40 microns can be wet-applied over the paint replacement film.

Various modifications and alterations of the invention will become apparent to those skilled in the art without departing from the spirit and scope of the invention, which is defined by the accompanying claims. It should be noted that steps recited in any method claims below do not necessarily need to be performed in the order that they are recited. Those of ordinary skill in the art will recognize variations in performing the steps from the order in which they are recited.

The invention claimed is:

1. A paint replacement film comprising at least three distinct layers as follows:
   at least one adhesive layer;
   at least one pigmented layer having a maximum thickness of about 25 microns; and
   at least one polymer layer, wherein the paint replacement film excluding the at least one adhesive layer has a thickness of about 25 microns to about 50 microns and is essentially free of fluoropolymer materials, and wherein all adjacent layers within the paint replacement film are covalently bonded to each other to form the paint replacement film.

2. The paint replacement film of claim 1, wherein surface tension of each layer within the paint replacement film is within about 5 dynes per centimeter of surface tension of adjacent layers therein.

3. The paint replacement film of claim 2, wherein each of the at least one adhesive layer, the at least one pigmented layer, and the at least one polymer layer is covalently bonded to at least one other of the at least one adhesive layer, the at least one pigmented layer, and the at least one polymer layer.

4. The paint replacement film of claim 1, wherein the at least one pigmented layer comprises ink.

5. The paint replacement film of claim 1, wherein the at least one pigmented layer is discontinuous.

6. The paint replacement film of claim 1, wherein the at least one polymer layer is thicker than the at least one pigmented layer.

7. The paint replacement film of claim 1, wherein the at least one polymer layer is polyurethane-based.

8. The paint replacement film of claim 7, wherein each of the at least one adhesive layer, the at least one pigmented layer, and the at least one polymer layer is covalently bonded to at least one other of the at least one adhesive layer, the at least one pigmented layer, and the at least one polymer layer.

9. The paint replacement film of claim 1, wherein the at least one polymer layer has a thickness of about 10 microns to about 50 microns.

10. The paint replacement film of claim 1, wherein the at least one polymer layer has a thickness of about 25 microns or less.

11. The paint replacement film of claim 1, wherein the at least one adhesive layer comprises a pressure-sensitive adhesive.

12. The paint replacement film of claim 1, wherein the at least one adhesive layer comprises a (meth)acrylate.

13. The paint replacement film of claim 11, wherein the paint replacement film is capable of being efficiently removed from a surface of an article to which it is applied in a unitary piece when desired.

14. The paint replacement film of claim 1, wherein the at least one adhesive layer has a thickness of about 5 microns to about 150 microns.

15. The paint replacement film of claim 1, wherein the at least one adhesive layer has a thickness of about 25 microns or less.

16. The paint replacement film of claim 1, wherein the paint replacement film consists of sequential layers as follows:
   optionally, a release liner;
   the at least one adhesive layer;
   the at least one pigmented layer having a maximum thickness of about 8 microns;
   the at least one polymer layer, wherein the at least one polymer layer is essentially free of low surface energy materials and comprises a urethane, an epoxy, an acrylic, or a polyester; and
   optionally, a carrier opposite the release liner, wherein the paint replacement film exhibits flexibility for adherence of the paint replacement film to curved or otherwise non-planar surfaces.

17. The paint replacement film of claim 16, wherein the paint replacement film is capable of being efficiently removed from a surface of an article to which it is applied in a unitary piece when desired.

18. The paint replacement film of claim 16, wherein the at least one polymer layer that is essentially free of low surface energy materials comprises a urethane, an epoxy, or a polyester.

19. The paint replacement film of claim 1, wherein the at least one adhesive layer is on an exterior surface of the paint replacement film.

20. The paint replacement film of claim 1, wherein the at least one pigmented layer and the at least one polymer layer are covalently bonded to each other.

21. The paint replacement film of claim 1, wherein each of the at least one adhesive layer, the at least one pigmented layer, and the at least one polymer layer is covalently bonded to at least one other of the at least one adhesive layer, the at least one pigmented layer, and the at least one polymer layer.

22. The paint replacement film of claim 1, wherein the paint replacement film is capable of being efficiently removed from a surface of an article to which it is applied in a unitary piece when desired.

23. The paint replacement film of claim 1, wherein the paint replacement film excluding the at least one adhesive layer is essentially free of low surface energy materials.

24. An article comprising at least one surface having on at least a portion thereof the paint replacement film of claim 1.

25. The article of claim 24, wherein the article comprises a motorized vehicle.

26. The article of claim 24, wherein the article comprises an aircraft.

27. A paint replacement composite article comprising:
   the paint replacement film of claim 1, and
   a topcoat on a surface of the paint replacement film opposite the at least one adhesive layer.

28. The paint replacement composite article of claim 27, wherein the topcoat comprises a polyurethane-based material.

29. The paint replacement composite article of claim 27, wherein the topcoat comprises a clearcoat.

30. The paint replacement composite article of claim 27, wherein the topcoat is about 20 microns to about 40 microns thick.

31. A method of protecting a surface, the method comprising:
   adhering the paint replacement film of claim 1 to at least a portion of at least one exterior surface of an article, and
   applying a topcoat to essentially the entire exposed exterior surface of the article, except for those surfaces where the topcoat would detract from function of the underlying surface or article.

32. The method of claim 31, wherein the article comprises an aircraft.

* * * * *